2,862,903
Patented Dec. 2, 1958

2,862,903

ACETONITRILE-WATER AZEOTROPIC SOLUTIONS OF VINYLIDENE CYANIDE POLYMER AND PROCESS FOR PREPARING SAME

Gerald V. Wootton, Lorain, Ohio, assignor to The B. F. Goodrich Company, New York, N. Y., a corporation of New York No Drawing. Application February 1, 1957
Serial No. 637,617

6 Claims. (Cl. 260—29.6)

This invention relates to novel polymer solutions, and pertains more particularly to spinning dope solutions of certain vinylidene cyanide interpolymers in an azeotropic mixture of acetonitrile and water.

U. S. Patents 2,476,270, 2,502,412 and 2,514,387 disclose novel methods for the preparation of monomeric vinylidene cyanide, which is a clear liquid at room temperature and a crystalline solid at 0° C., possessing a melting point when in purest form of about 9.7° C., and which undergoes on contact with water an instantaneous homopolymerization reaction to give a solid water-insoluble resin. On copolymerization of this monomer in mass or in anhydrous organic medium with various other polymerizable materials there are obtained interpolymers which are extremely useful in the preparation of filaments, films and shaped articles possessing many valuable properties including high tensile strengths, low elongation and excellent resistance to the action of chemicals and the weather.

Many interpolymers of vinylidene cyanide with other olefinic monomers are particularly unique and useful in that they possess the unusual 1:1 alternating structure, that is, they possess essentially the structure

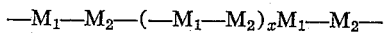

wherein each $M_1$ is a vinylidene cyanide unit of the structure

each $M_2$ is a unit of the olefinic comonomer polymerized with the vinylidene cyanide, and $x$ is a number, preferably in excess of 100. Analysis of such interpolymers shows that they contain 50 mol percent ±5 mol percent of vinylidene cyanide units regardless of the degree of monomer to polymer conversion, and hence they are essentially 50 mol percent alternating interpolymers.

It has been found, however, that many economical solvents ordinarily employed to dissolve more conventional polymeric materials do not possess sufficient solvent power to dissolve such alternating vinylidene cyanide interpolymers. Moreover the few known solvents for such interpolymers are either quite expensive, or not available in commercial quantities, or undesirable, or dangerous to use.

Accordingly it is an object of this invention to provide economical and commercially available materials which possess a high degree of solvent power for essentially 50 mol percent alternating vinylidene cyanide interpolymers. Another object is to provide colorless, stable solutions of such vinylidene cyanide interpolymers which solutions possess a viscosity such that they are highly suitable for use in the preparation of shaped articles, the casting of films, and the spinning of fibers. A further object is to provide a spinning dope solution for vinylidene cyanide interpolymers which can be spun into fibers at atmospheric pressure and temperatures below the boiling point of the solvent preferably at room temperature or temperatures slightly above room temperature. Still another object is to provide such a spinning dope solution from which excess solvent is easily recoverable for further use. Other objects of the invention will be apparent from the description which follows.

As disclosed in U. S. Patent No. 2,649,426, acetonitrile and other organic nitriles of the structure RCN, wherein R is a hydrocarbon radical or a chlorine-substituted hydrocarbon radical containing from 1 to 7 carbon atoms and in which any unsaturation is present in a benzene ring, alone or with other non-solvent hydrocarbons such as dioxane, form useful solvents for vinylidene cyanide interpolymers.

The use of 100 percent organic nitrile solvent for vinylidene cyanide interpolymers presents certain problems. For instance, the solvent is too expensive to use once and throw away, so it must be recovered, preferably by distillation.

Most of the accepted spinning baths into which these vinylidene cyanide interpolymer fibers are spun contain from 50 to 100 percent water, therefore a great deal of water is usually mixed with the acetonitrile and polymer residues when recovery is started. Acetonitrile boils at 81.6° C. and atmospheric pressure and an azeotropic mixture of approximately 85 percent acetonitrile—15 percent water by weight boils at 76.5° C. Analysis checks of azeotropic mixtures show a water content of about 14.7 percent to about 16 percent. Nearly all of the acetonitrile present will come over in the form of the water azeotrope, of course, and further fractionation of this azeotrope to recover pure acetonitrile is expensive and time-consuming. A complicated drying operation is required.

Water is known to be a non-solvent for vinylidene cyanide interpolymers, but I have surprisingly found that the acetonitrile-water azeotrope is an efficient, practical solvent for vinylidene cyanide interpolymers, hence the azeotropic mixture can be used initially in forming the polymer dope solutions with a substantial savings both in the amount of pure acetonitrile needed and in the necessary recovery operations.

Use of acetonitrile-water azeotrope has been found to offer several desirable advantages over 100 percent acetonitrile as a solvent for vinylidene cyanide interpolymers. The solvent recovery process is reduced from a distillation plus a complicated drying operation to a simple distillation. Azeotrope solvent does not require refrigeration of polymer slurry in preparing spinning dopes. With pure acetonitrile such a step is almost mandatory to avoid "balling-up" of the polymer into troublesome aggregates. Azeotrope solutions often exhibit clearer, more stable, colorless solutions than does pure acetonitrile solvent. Since the azeotrope spinning dopes are less viscous than those prepared with pure acetonitrile, any required filtration or pumping operations are simplified. As water comprises 15 percent by weight of the solvent 15 percent less relatively expensive organic solvent is required for initial dope make-up and the unavoidable losses due to evaporation, leakage, handling, etc. of the nitrile are proportionately reduced. On a commercial scale, use of the azeotrope will lead to lower utility costs and a savings in man-power requirements. The azeotrope spinning dopes have fairly low freezing points in the neighborhood of 40° C. while the azeotrope mixture itself has a freezing point of —10° C., which is helpful when either solvent or dope is exposed to cold, wintery conditions.

The vinylidene cyanide interpolymers which form useful spinning and casting solutions in the acetonitrile-water azeotrope mixtures according to this invention include any interpolymer of vinylidene cyanide with one or more olefinic monomers copolymerizable therewith provided that the interpolymer contains from 45 to 55 mol percent of vinylidene cyanide units. In a polymer of such vinylidene cyanide content the nature of the remaining units derived from olefinic monomer, is not critical. However, in order to obtain such an interpolymer it is preferable to employ in the interpolymerization at least one olefinic monomer which copolymerizes with vinylidene cyanide to form an essentially 1 to 1 (or 50 mol percent) alternating copolymer.

Among the polymerizable olefinic compounds which form the essentially 1:1 alternating copolymers with vinylidene cyanide are included, by way of example, those mentioned in U. S. Patents 2,615,865 through 2,615,877, the disclosures of which are incorporated herein by reference.

In addition to solutions containing the two-component interpolymers of vinylidene cyanide which have the essentially 1 to 1 molar alternating structure and essentially 50 mol percent vinylidene cyanide units, such as those disclosed in the patents referred to above, solutions of other vinylidene cyanide interpolymers containing from 45 to 55 percent vinylidene cyanide are also within the scope of this invention. For example, there are included interpolymers, of this vinylidene cyanide content, made from vinylidene cyanide and more than one copolymerizable olefinic compound, a large number of which interpolymers are disclosed in U. S. Patents 2,716,104 through 2,716,106, the disclosures of which are incorporated herein by reference.

It is thus apparent that this invention contemplates the use of a generic class of interpolymers of vinylidene cyanide with a copolymerizable olefinic compound, which interpolymers contain from about 45 to 55 mol percent of vinylidene cyanide units, and that the nature of the remaining units is not critical.

The solutions of vinylidene cyanide interpolymers in the acetonitrile-water azeotrope solvent of this invention are prepared by the methods ordinarily employed in dissolving high polymers. For example, solution may be accomplished simply by placing the polymer, which is generally in the form of a white powder of small particle size, in the solvent, then agitating and heating the mixture at about 40° C. to 80° C., since solution of the polymer is thereby facilitated.

Solutions having any desired polymer concentration may be prepared since the solvent and polymer utilized in this invention are compatible with one another regardless of precise proportions of each. However, the solvent is generally maintained in considerable excess, to secure a fluid solution, and solutions containing from about 5 to 30 or 40 percent of polymer are preferred for spinning into fibers or casting into films.

The following examples are intended to illustrate more fully the use of the acetonitrile-water azeotropic mixture as solvents for vinylidene cyanide interpolymers, but are not intended to limit the scope of the invention, for it is, of course, possible to effect many modifications therein. In the examples all parts are by weight. Denier is defined as thickness of a filament expressed as weight in grams of 9000 meters. Tenacity is defined as grams per denier at break, and elongation is percent stretch of a filament at break.

Example I

Acetonitrile-water azeotrope (85–15 percent by weight) was prepared in a flask by mixing 26.48 pounds of acetonitrile and 4.67 pounds of water. The flask was placed in a cool water bath at 5–10° C. A 16.5 percent by weight copolymer solution was then made by adding 6 pounds, 4 ounces of a 1 to 1 molar vinylidene cyanide: vinyl acetate copolymer in the form of a white powder, prepared according to the teachings of U. S. Patent 2,615,866 to form a slurry which was agitated at the low temperature for 15 minutes. The bath was then heated to 60° C., at which temperature the slurry formed a smooth, homogeneous dope which was stirred for one hour.

The spinning dope was extruded through a multihole spinneret with holes 0.005" in diameter; the filaments so formed were immersed in a spinning bath of 10 percent acetonitrile-90 percent water, carried over Godet wheels, through heated tubes and finally over a drum drier to a storage bobbin, a series of steps well known and practiced in the spinning art.

When tested on standard textile testing machines, the filaments produced in this example give the following results:

Denier _____ 969 to 1225
Tenacity _____ 1.32 to 1.75
Elongation _____percent__ 14.3 to 19.0

Example II

As in Example I, a batch of acetonitrile-water azeotrope was prepared except that the water bath was not pre-cooled. This time 7 pounds, 13 ounces of 1 to 1 molar vinylidene cyanide:vinyl acetate copolymer was added to form a 20 percent polymer solution.

Extrusion, immersion, heating, stretching and relaxing were performed as in Example I. Filaments of the example tested as follows:

Denier _____ 1026–2027
Tenacity _____ 1.54– 1.75
Elongation _____percent__ 17– 19

Example III

A slurry was formed in a flask at room temperature by adding 6 pounds, 4 ounces of 1 to 1 molar vinylidene cyanide:vinyl acetate copolymer powder to 31.15 pounds of acetonitrile-water azeotrope which had been recovered from the distillation of acetonitrile-water spinning bath contents that had been collected from previous runs and which contained polymer residues which made them no longer suitable for fiber spinning baths. Distillation at 76.5° C. and atmospheric pressure had produced an essentially pure 85/15 acetonitrile-water azeotrope. The slurry was converted to a smooth spinning dope by continued agitation and gradual heating of the bath and contents to 70° C. As in previous examples, strong, lustrous filaments were spun when the dope was extruded through the multi-hole spinneret.

Example IV

One to one molar copolymers of vinylidene cyanide and vinyl chloride (U. S. Patent 2,615,870), of vinylidene cyanide and styrene (U. S. Patent 2,615,868), and of vinylidene cyanide and isobutylene (U. S. Patent 2,615,865) were similarly dissolved in acetonitrile-water azeotrope, extruded and spun to storage bobbins. In all cases strong, smooth filaments were produced. Again no pre-cooling of the solvent before addition of the copolymer was needed. Smooth solutions formed with both temperatures starting at room temperature and ranging up to 60° C.

Although specific examples of the invention have been herein described, it is not intended to limit the invention solely thereto, but to include all of the variations and modifications falling within the spirit and scope of the appended claims.

I claim:

1. A spinning dope solution comprising as the solvent the azeotropic mixture of 85% by weight acetonitrile and 15% by weight of water which boils at 76.5° C. at atmospheric pressure, and, as the solute, sufficient equimolar interpolymer of vinylidene cyanide and another olefinic monomer copolymerizable therewith to form a 15 to 25 percent solution by weight of said solute in said solvent.

2. The solution of claim 1 in which the vinylidene cyanide interpolymer is a copolymer of vinylidene cyanide and vinyl acetate.

3. The solution of claim 1 in which the vinylidene cyanide interpolymer is a copolymer of vinylidene cyanide and vinyl chloride.

4. The solution of claim 1 in which the vinylidene cyanide interpolymer is a copolymer of vinylidene cyanide and styrene.

5. The solution of claim 1 in which the vinylidene cyanide interpolymer is a copolymer of vinylidene cyanide and isobutylene.

6. The method of forming a spinning dope solution of a vinylidene cyanide and 55 to 45 mol percent of another olefinic monomer copolymerizable therewith interpolymer containing about 45 to 55 mol percent vinylidene cyanide which comprises adding said interpolymer to an azeotropic mixture of acetonitrile-water which contains 85 percent acetonitrile and 15 percent water by weight at room temperature in such proportions as to provide 5 to 50 percent by weight of said interpolymer, and then stirring and slowly heating the slurry which first forms to a temperature of about 60° C. whereby to form a smooth, homogeneous spinning dope solution.

References Cited in the file of this patent

UNITED STATES PATENTS 2,649,426    Gilbert et al. _____ Aug. 18, 1953

OTHER REFERENCES

Othmer et al.: Ind. Eng. Chem., volume 39, pages 1175–1177 (1947).